(12) United States Patent
Evans et al.

(10) Patent No.: US 10,892,608 B2
(45) Date of Patent: *Jan. 12, 2021

(54) APPARATUS FOR CABLE PROCESSING

(71) Applicant: THE BOEING COMPANY, Chicago, IL (US)

(72) Inventors: Nick S. Evans, Lynnwood, WA (US); Bradley J. Mitchell, Snohomish, WA (US); Kevin Callahan, Shoreline, WA (US)

(73) Assignee: The Boeing Company, Chicago, IL (US)

(*) Notice: Subject to any disclaimer, the term of this patent is extended or adjusted under 35 U.S.C. 154(b) by 400 days.

This patent is subject to a terminal disclaimer.

(21) Appl. No.: 15/926,050

(22) Filed: Mar. 20, 2018

(65) Prior Publication Data

US 2018/0212409 A1 Jul. 26, 2018

Related U.S. Application Data

(63) Continuation of application No. 14/445,642, filed on Jul. 29, 2014, now Pat. No. 9,966,742.

(51) Int. Cl.
*H02G 1/12* (2006.01)
(52) U.S. Cl.
CPC ......... *H02G 1/1256* (2013.01); *H02G 1/1297* (2013.01); *Y10T 29/49123* (2015.01)
(58) Field of Classification Search
CPC ............... H02G 1/1256; H02G 1/1297; Y10T 29/49123
See application file for complete search history.

(56) References Cited

U.S. PATENT DOCUMENTS

| 2,902,797 | A | | 9/1959 | Carpenter |
| 3,095,768 | A | | 7/1963 | Walstrom |
| 3,153,358 | A | * | 10/1964 | Havens ................ H02G 1/1256 81/9.51 |
| 4,597,176 | A | | 7/1986 | Shields et al. |
| 4,914,986 | A | | 4/1990 | Masaki |
| 5,016,398 | A | | 5/1991 | Fukunaga |

(Continued)

FOREIGN PATENT DOCUMENTS

| DE | 4027904 | | 3/1992 | |
| DE | 4027904 A1 | * | 3/1992 | ........... H02G 1/1273 |

OTHER PUBLICATIONS

The Eraser Company Inc. "D1 Wheel Stripper"; https://www.eraser.com/products/wire-cable-strippers-product/wheel-strippers/d1-wheel-stripper . . . . Printed Apr. 25, 2017.

(Continued)

*Primary Examiner* — Livius R. Cazan
(74) *Attorney, Agent, or Firm* — Perman & Green LLP

(57) ABSTRACT

An apparatus for processing a cable including an insulating member, a shielding layer, and a conductor, the apparatus includes a frame forming a housing having an aperture configured to receive an end portion of the cable; a first gripping member disposed within the housing and being configured to grip the cable; and a second gripping member disposed within the housing and being configured to grip the cable; wherein the second gripping member is mounted within the housing so as to be movable relative to the first gripping member to effect fanning and cutting of a portion of the shielding layer.

20 Claims, 12 Drawing Sheets

(56) References Cited

U.S. PATENT DOCUMENTS

| | | |
|---|---|---|
| 5,047,169 A | 12/1991 | Matz |
| 5,072,632 A | 12/1991 | Sayyadi |
| 5,138,910 A | 8/1992 | Ishikawa et al. |
| 5,272,941 A | 12/1993 | English et al. |
| 5,664,324 A | 9/1997 | Hoffa et al. |
| 5,819,602 A | 10/1998 | Brask et al. |
| 6,546,617 B1 | 4/2003 | Hayashi et al. |

OTHER PUBLICATIONS

Ideal Industries, Inc. "Ideal Coax Cable Stripper—(Rotary Style Stripper)"; http://www.idealindustries.com/prodDetail.do?prodId=45-552&div=6&l1=bench_machines&l2=45-552.

The Schleuniger Group, "CoaxStrip 5200—(Rotary Style Stripper)"; http://www.schleuniger.com/products/p/coaxstrip-5200/.

* cited by examiner

APPARATUS FOR CABLE PROCESSING

CROSS-REFERENCE TO RELATED APPLICATIONS

This application is a continuation of and claims the benefit of U.S. Non-Provisional patent application Ser. No. 14/445,642 filed on Jul. 29, 2014, the disclosure of which is incorporated by reference herein in its entirety.

FIELD

The aspects of the disclosed embodiment relate to cable processing and more particularly to apparatus for cutting and/or folding components of a cable.

BACKGROUND

A wiring harness includes a bundle of cables, and each cable can include multiple wires (each having a conductor 203—FIG. 2) therein. At least some known cables include at least one wire surrounded by a shielding layer 202 (FIG. 2) which is surrounded by a wire jacket or insulating member 201 (FIG. 2). While assembling a wiring harness, a portion of the insulating member 201 is removed, and a portion of the exposed shielding 202 is removed. In some cases the shielding 202 is smoothed down over the wire(s) (e.g., dead-ended applications) or folded back over the wire jacket or insulating member 201 (e.g., grounded applications).

Generally wire shielding is cut manually to avoid, for example, damage to the underlying wires. During cutting of the shielding an operator has to manually fan the shielding out, then utilize wire cutters to trim off segments of the shielding material while being careful not to damage the underling wires. The cut shielding is then manually smoothed down over the wire(s) or folded back over the wire jacket. This shielding cutting and folding process is slow, includes risk of an operator damaging the underlying wires and is not repeatable due to, for example, variations in operator technique.

Although some conventional wire stripping tools may exist, such as tools for use with cylindrical cables (e.g., coaxial cables) that have a filler to make the cross section of the cable round. At least in the aerospace industry, the filler is omitted from the cables for weight savings, leaving the cable with an irregular cross-sectional shape not suitable for use with the conventional wire stripping tools.

SUMMARY

Accordingly, apparatus and method, intended to address the above-identified concerns, would find utility.

One example of the present disclosure relates to an apparatus for processing a cable including an insulating member, a shielding layer, and a conductor, the apparatus includes a frame forming a housing having an aperture configured to receive an end portion of the cable; a first gripping member disposed within the housing and being configured to grip the cable; and a second gripping member disposed within the housing and being configured to grip the cable; wherein the second gripping member is mounted within the housing so as to be movable relative to the first gripping member to effect fanning and cutting of a portion of the shielding layer.

One example of the present disclosure relates to an apparatus for cable processing including a frame forming a housing, and a clamping system configured to automatically fan and cut a shielding layer of a cable inserted into the apparatus, and remove a cut portion of the shielding layer from the cable.

One example of the present disclosure relates to a method for processing a cable having an insulating member, a shielding layer and one or more conductors, includes positioning a first shielding gripper and a second shielding gripper relative to the cable so that each of the first and second shielding gripper grip at least the shielding layer; moving the first and second shielding grippers relative to each other so that one or more of the first and second shielding gripper moves along a longitudinal axis of the cable towards the other one of the first and second shielding gripper to fan of a portion of the shielding layer gripped by the first and second shielding grippers; and shearing the portion of the shielding layer from the cable with the first and second shielding grippers through the relative movement of the first and second shielding grippers.

One example of the present disclosure relates to a cable processing system including a frame having at least a first movable member and a second movable member; a first shielding gripper disposed on the first movable member, the first shielding gripper being configured for placement around and gripping of at least a shielding layer of a cable; and a second shielding gripper disposed on the second movable member, the second shielding gripper being configured for placement around and gripping of at least the shielding layer of the cable, the first and second shielding gripper are arranged on the frame so that the cable passes simultaneously through both the first and second shielding grippers; wherein the frame is arranged so that relative movement of the first and second movable members causes relative movement between the first and second shielding grippers to fan and circumferentially shear the shielding layer with the first and second shielding grippers.

BRIEF DESCRIPTION OF THE DRAWINGS

Figure 1:
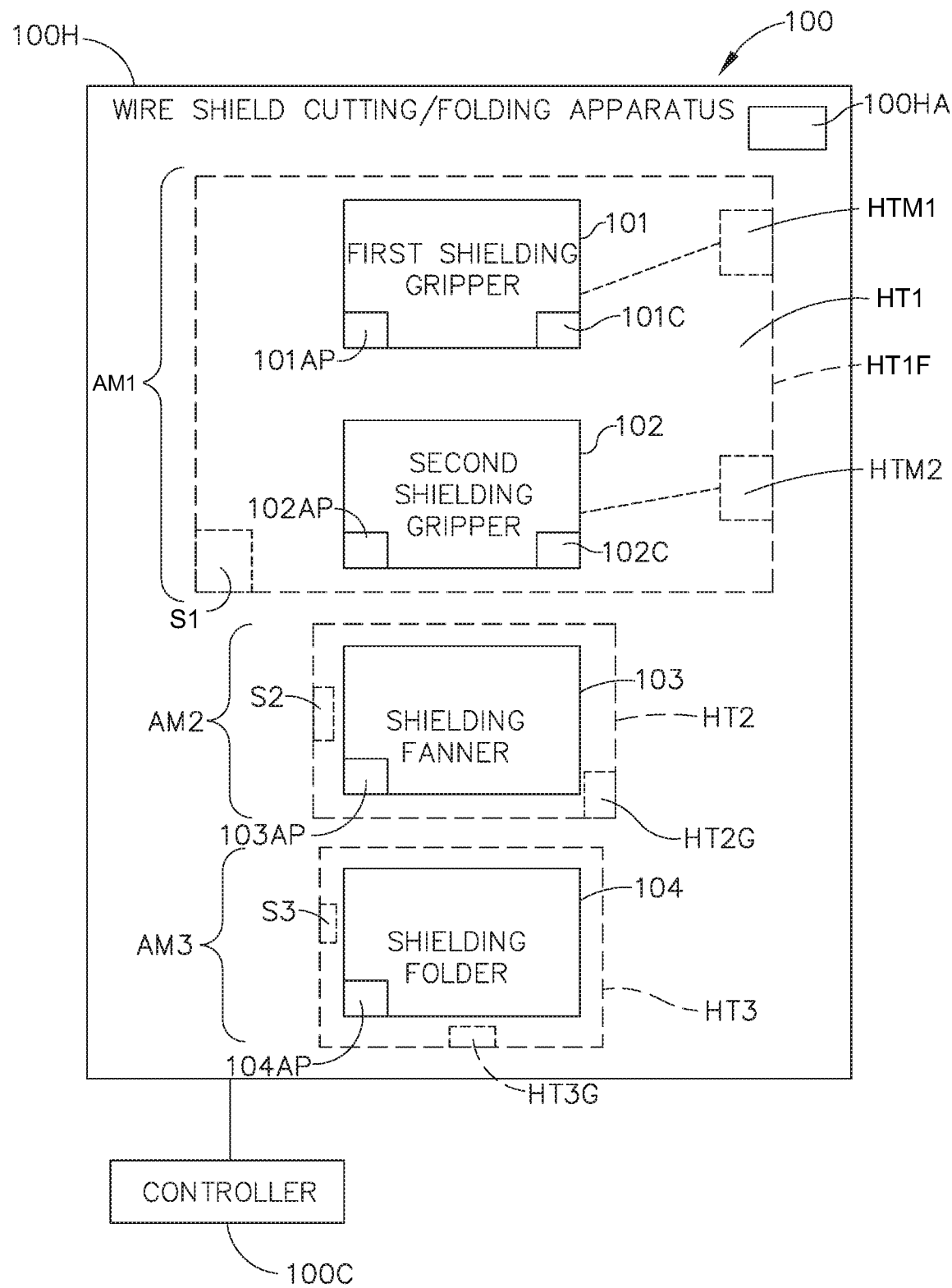
Figure 1A:
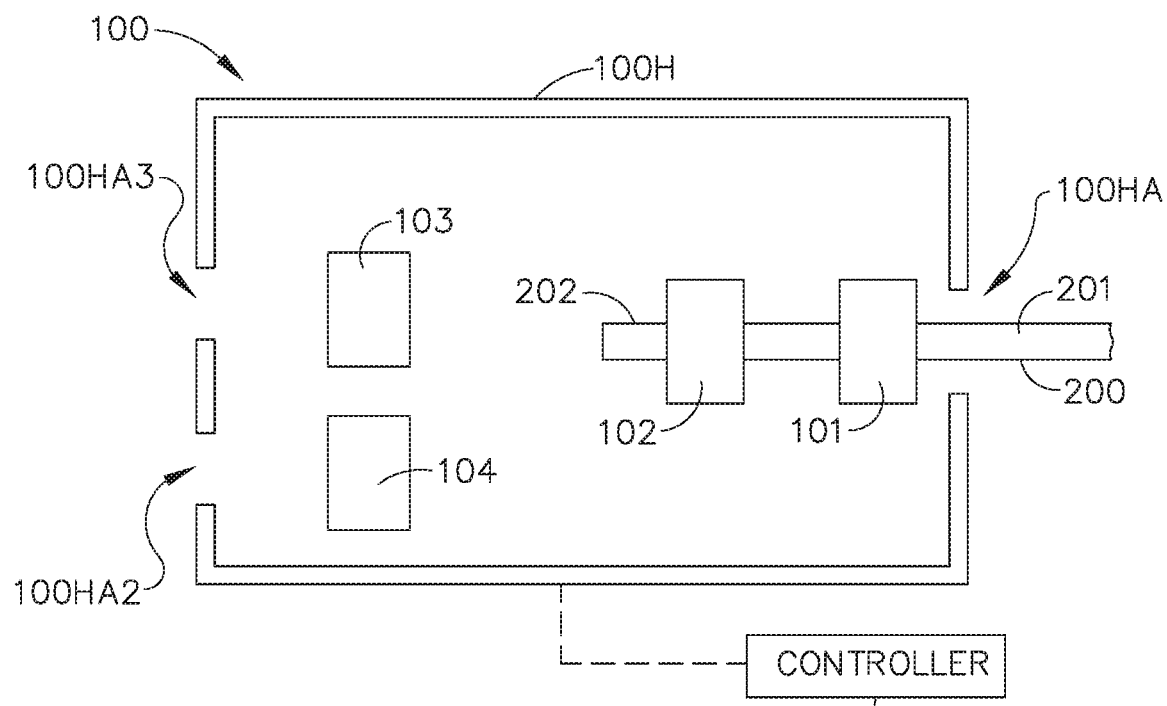
Figure 2:
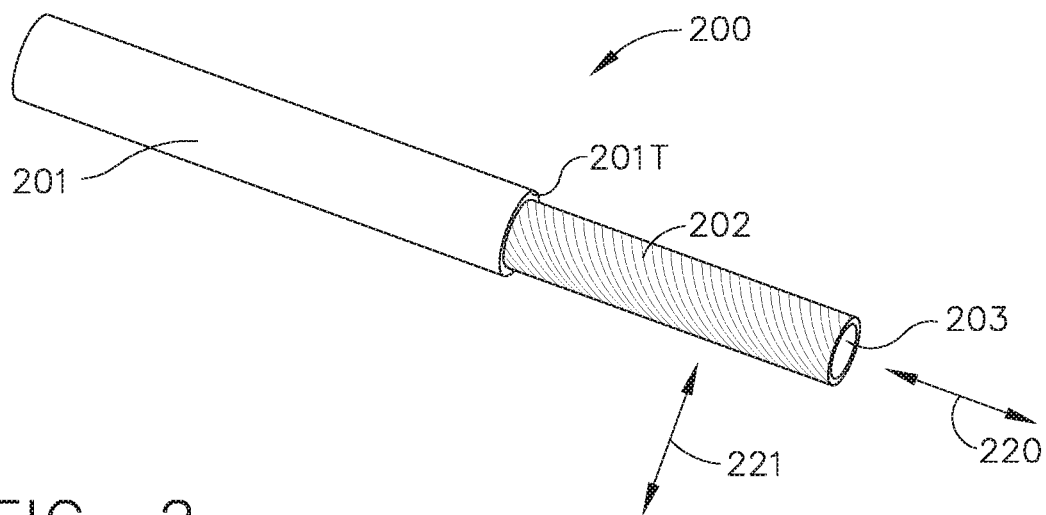
Figure 14:
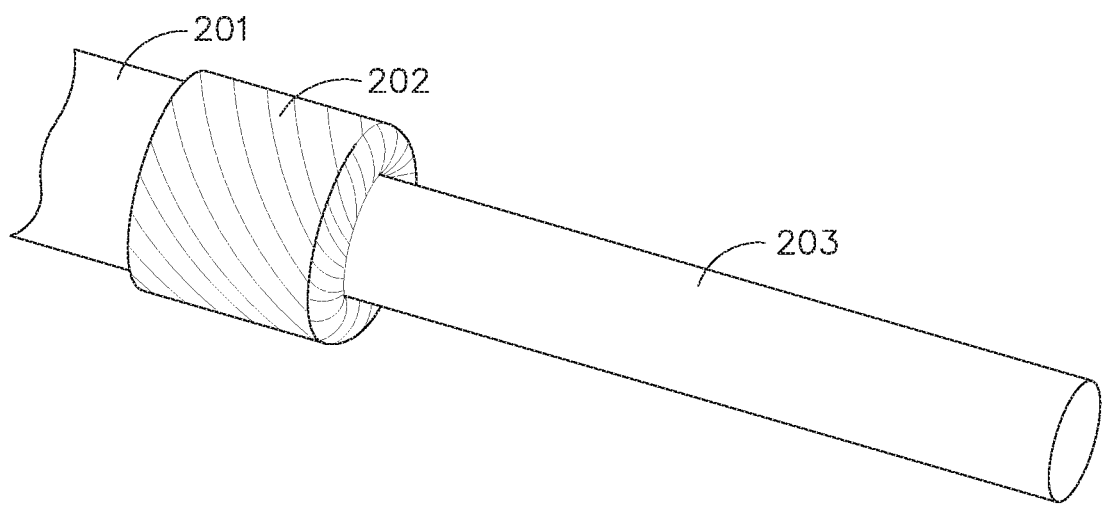
Figure 15:
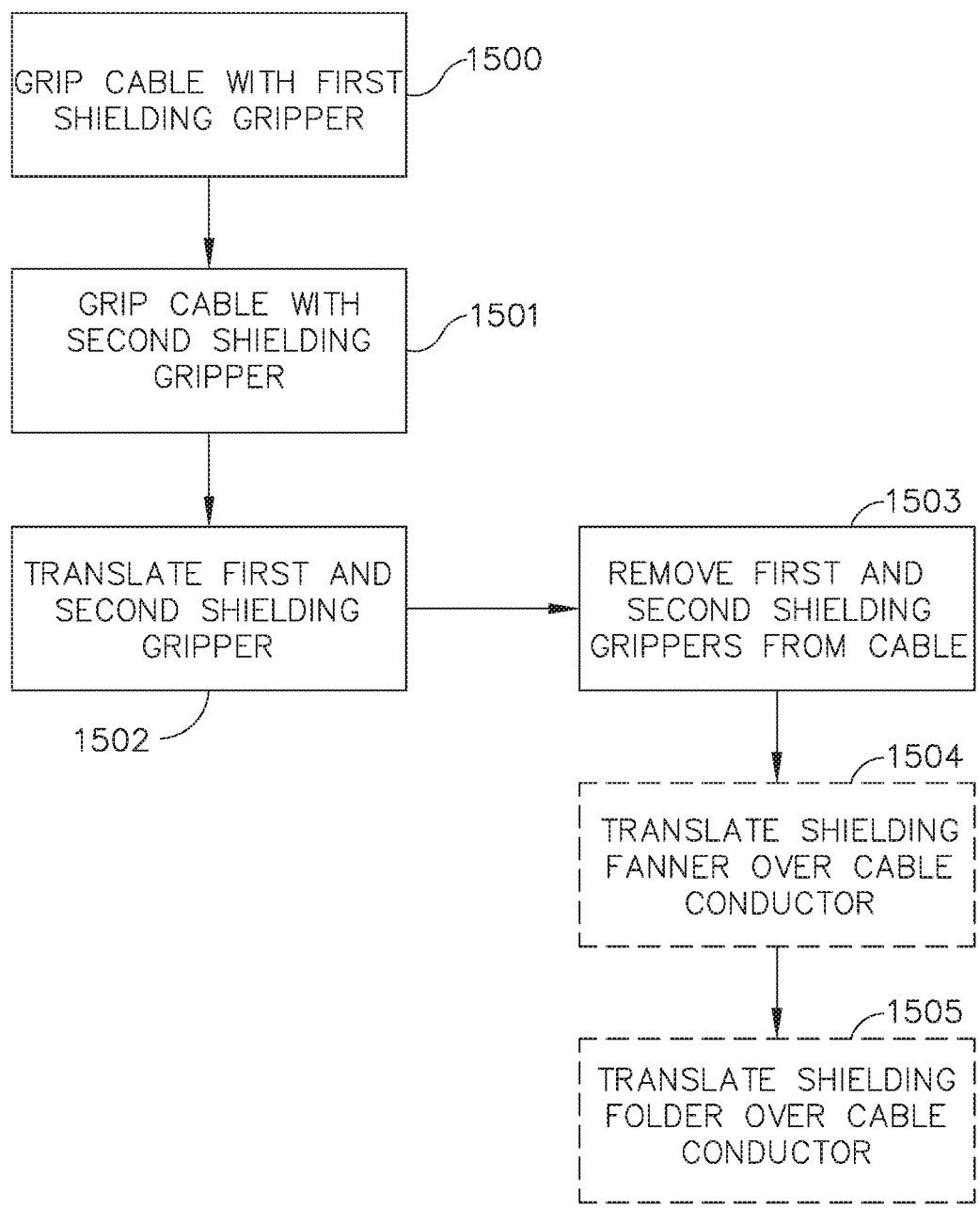
Figure 16:
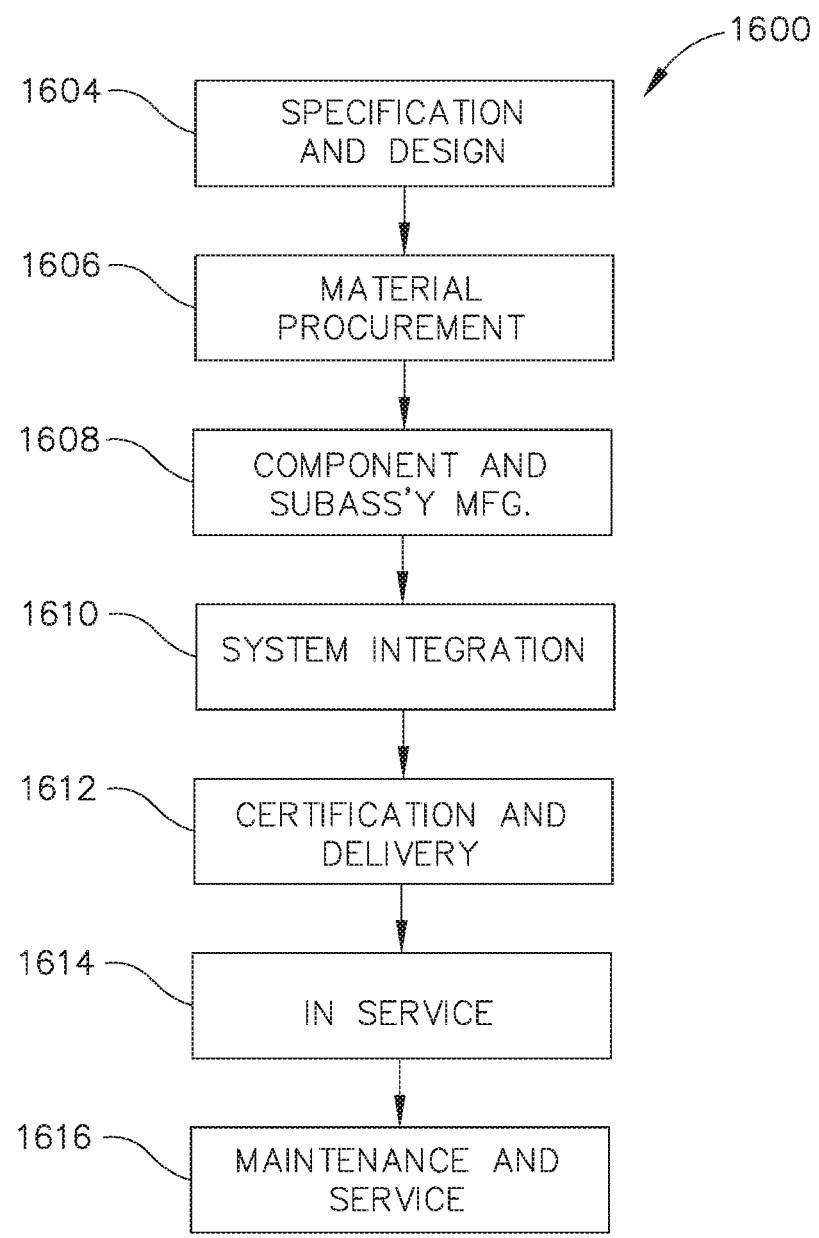

Having thus described examples of the disclosure in general terms, reference will now be made to the accompanying drawings, Which are not necessarily drawn to scale, and wherein like reference characters designate the same or similar parts throughout the several views, and wherein:

FIG. 1 is a block diagram of a cable shielding cutting and folding mechanism or apparatus, according to aspects of the disclosed embodiment;

FIG. 1A is a schematic illustration of a cable shielding cutting and folding mechanism or apparatus, according to aspects of the disclosed embodiment;

FIG. 2 is a schematic illustration of a cable, according to aspects of the disclosed embodiment;

FIGS. 3-13 are schematic illustrations of portions of the cable shielding cutting and folding apparatus engaging the wire, according to aspects of the disclosed embodiment;

FIG. 14 is a schematic illustration of a cable including cut and folded shielding in accordance with aspects of the disclosed embodiment;

FIG. 15 is a flow diagram of a method in accordance with aspects of the disclosed embodiment;

FIG. 16 is a flow diagram of aircraft production and service methodology; and

Figure 17:
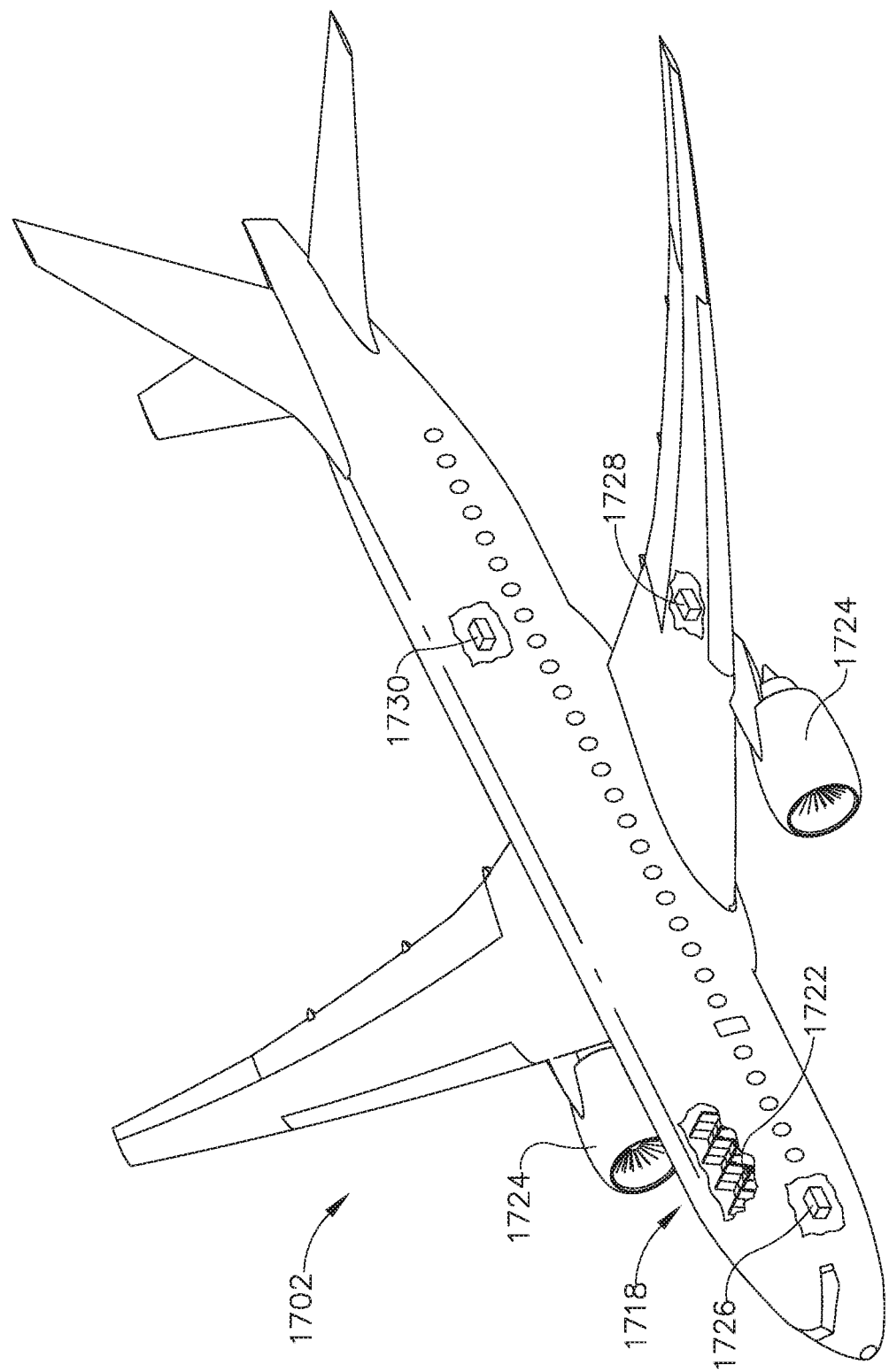

FIG. 17 is a schematic illustration of an aircraft.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring generally to FIGS. 1, 1A and 2, one example of the disclosed embodiment relates to a cable shielding cutting and folding mechanism or apparatus 100 (referred to herein as the "apparatus 100") for wire processing. It is noted that the term "cable" is inclusive of a "wire" which includes a single conductor within an insulating member. It is also noted that the "cable" may include one or more conductors within a common insulating member or jacket where each conductor may include a respective insulating member or jacket (i.e., the cable may include one or more wires disposed within the common insulting member). The apparatus 100 may be configured, as will be described below, to cut and fold shielding 202 of a cable 200 and enable a consistent automated and/or manual removal of cable shielding 202, As will be described in greater detail below, the apparatus 100 operates to fan the shielding out by displacing the shielding 202 material back toward the cable jacket or insulating member 201 to fan out the shielding 202 at a termination 201T of the insulating member 201. Two (e.g., a first and a second) circumferential shielding grippers 101, 102 of clamping system 199CS (FIG. 7) are moved relative to one another over the cable 200 to induce the fanning of the shielding 202 at a predetermined location such that the relative movement between the first and second shielding grippers shears at least a portion of the fanned shielding. In one aspect the first and second shielding grippers 101, 102 may be in the form of mating dies that are sized and shaped to cut or otherwise shear the shielding 202 at a predetermined distance from the insulating member 201 termination 201T. The first and second shielding grippers 101, 102 are configured to cause a spherical shearing of the shielding 202 around the entire circumference of the cable 200. The first and second shielding grippers 101, 102 may also be configured to "clean" the cable by removing the sheared shielding and flattening or otherwise smoothing the uncut portion of the shielding 202 that remains on the cable 200. In one aspect, the shielding 202 may be optionally folded back over the insulating member 201 with a shielding folder 104. The apparatus 100 may automate the removal and finishing of the shielding 202 layer of the cable or cable 200.

In one aspect, referring to FIGS. 1 and 1A, the apparatus 100 may be an automated machine that may be a standalone machine or be incorporated as a module within a larger wire harness processing machine. Here the cable shielding cutting and folding apparatus 100 may include a frame forming a housing 100H and a first and second shielding gripper 101, 102, an optional shielding fanner 103 and an optional shielding folder 104 disposed within the housing 100H. The automated machine may also include any suitable controller 1000, which includes suitable programming code for performing the fanning, cutting and/or folding of the shielding 202 and the "cleaning" of the cable or cable 200 as described herein. For example, the automated machine may include a first portion AM1 including the first and second shielding gripper 101, 102, an optional second portion including the shielding fanner 103 and an optional third portion that includes the shielding folder 104. In one aspect the automated machine may be configured such that either the cable 200 is moved between portions AM1, AM2, AM3 of the automated machine (which each include a respective aperture 100HA, 100HA2, 100HA3 through which the cable 200 is inserted into the housing 100H to interact with the respective portion AM1, AM2, AM3) such that the cable shielding is cut and optionally folded, e.g., by automatically moving the first and second shielding grippers 101, 102, shielding fanner 103 and shielding folder 104, in the manner described herein. In other aspects the portions AM1, AM2, AM3 of the automated machine may be movable within the housing 100H to engage and disengage the cable 200 while the cable 202 is held stationary (e.g., such as when inserted through aperture 100HA) such that the portions AM1, AM2, AM3 of the automated machine are placed over and removed from the cable 200 such that the cable shielding 202 is cut and folded, e.g., by automatically moving the first and second shielding grippers 101, 102, shielding fanner 103 and shielding folder 104, in the manner described herein. In still other aspects the automated machine may have any suitable configuration, for cutting and folding the shielding 202, that includes the first and second shielding gripper 101, 102, and optionally the shielding fanner 103 and the shielding folder 104. In one aspect, the first shielding gripper 101 may be disposed near or adjacent the aperture 100HA so that the cable 200 passes at least partially through the first shielding gripper 101 when the cable 200 is inserted through the aperture 100HA. The second shielding gripper 102 may be positioned relative to the first shielding gripper 101 such that the first shielding gripper 101 is disposed between the aperture 100HA and the second shielding gripper 102.

As may be realized, any suitable sensors S1, S2, S3 may be disposed at least partly within a respective portion AM1, AM2, AM3 of the automated machine. The sensors S1, S2, S3 may be connected to the controller 1000 in any suitable manner for at least partly effecting the control of the fanning, cutting and/or shield folding process. In one aspect the sensors may be contact sensors, such as limit switches that limit travel of, for example, linear actuators that move one or more of the first and second shielding grippers 101, 102, shielding fanner 103 and shielding folder 104 relative to the cable 200. In other aspects the sensors S1, S2, S3 may be one or more of optical, capacitive and inductive sensors that sense one or more of the first and second shielding grippers 101, 102, shielding fanner 103 and shielding folder 104 during movement. The sensors may send suitable signals to the controller 1000 when one or more of the first and second shielding grippers 101, 102, shielding fanner 103 and shielding folder 104 reach a predetermined location in the fanning, cutting and/or folding process such that upon reaching the predetermined position the controller 100C issues a suitable command to one or more components of the automated machine for proceeding to a next processing step as those steps are described herein. In yet other aspects, the sensors may detect the current draw on the motors of the linear or other actuators that move one or more of the first and second shielding grippers 101, 102, shielding fanner 103 and shielding folder 104 such that when the current rises above a predetermined level the movement of one or more of the first and second shielding grippers 101, 102, shielding fanner 103 and shielding folder 104 stops, and the controller 100C issues suitable commands for proceeding to a next processing step as those steps described herein.

In another aspect, referring to FIG. 1, the apparatus 100 may be one or more hand tools that include the first and second shielding gripper 101, 102, shielding fanner 103 and shielding folder 104. For example, a first hand tool HT1 may include the first and second shielding gripper and be configured to provide relative movement, as described herein, between the first and second shielding grippers for cutting the shielding 202. An optional second hand tool HT2 may include the shielding fanner 103 and be configured to cause relative movement between the shielding fanner 103 and the cable 200, as described herein, for fanning the shielding 202 prior to folding. An optional third hand tool HT3 may include the shielding folder 104 and be configured to cause relative movement between the shielding folder 104 and the cable 200, as described herein, for folding the shielding 202, For example, the second and third hand tools may include a cable gripping portion HT2G, HT3G for gripping a portion of the cable 202 (e.g., such as the cable insulating member 201) while the shielding fanner 103 and/or shielding folder 104 is moved relative to the cable 200. In other aspects the first and second shielding gripper 101, 102, shielding fanner 103 and shielding folder 104 may be incorporated into any suitable number of hand tools.

As may be realized each of the hand tools may include a frame having a first and second movable member HTM1, HTM2 to which the shielding grippers 101, 102, shielding fanner 103, shielding folder 104 and cable gripping portions HT2G, HT3G are coupled. For example, referring to hand tool HT1, the a first shielding gripper 101 may be disposed on the first movable member HTM1 of hand tool HT1 where the first shielding gripper 101 is configured for placement around and gripping of at least a shielding layer of a cable as described herein. The second shielding gripper 102 may be disposed on the second movable member HTM2 where the second shielding gripper 102 is configured for placement around and gripping of at least the shielding layer of the cable as described herein. The first and second shielding gripper are arranged on the frame HT1F of the hand tool HT1 so that the cable passes simultaneously through both the first and second cable gripper. The frame HT1F of the hand tool HT1 is arranged so that relative movement of the first and second movable members HTM1, HTM2 causes relative movement between the first and second shielding grippers 101, 102 to effect a fanning and circumferential shearing of the shielding layer with the first and second shielding gripper 101, 102 as described herein. The hand tools HT2, HT3 may have a substantially similar configuration to that of hand tool HT1 such that the cable gripping portions HT2G, HT3G are arranged on one of the movable members HTM1, HTM2 of the respective hand tool HT2, HT3 and the shielding fanner 103 and shielding folder 104 are arranged on the other one of the movable members HTM1, HTM2 of the respective hand tools HT2, HT3.

In yet another aspect, the apparatus 100 may be in the form of a tool having an automated portion and a hand tool portion. As a non-limiting example, operation of the first and second shielding grippers 101, 102 may be automated while the shielding fanner 103 and shielding folder 104 may be integrated into hand tools. In other aspects any suitable portion of the apparatus may be automated and/or hand tool operated.

Figure 3:
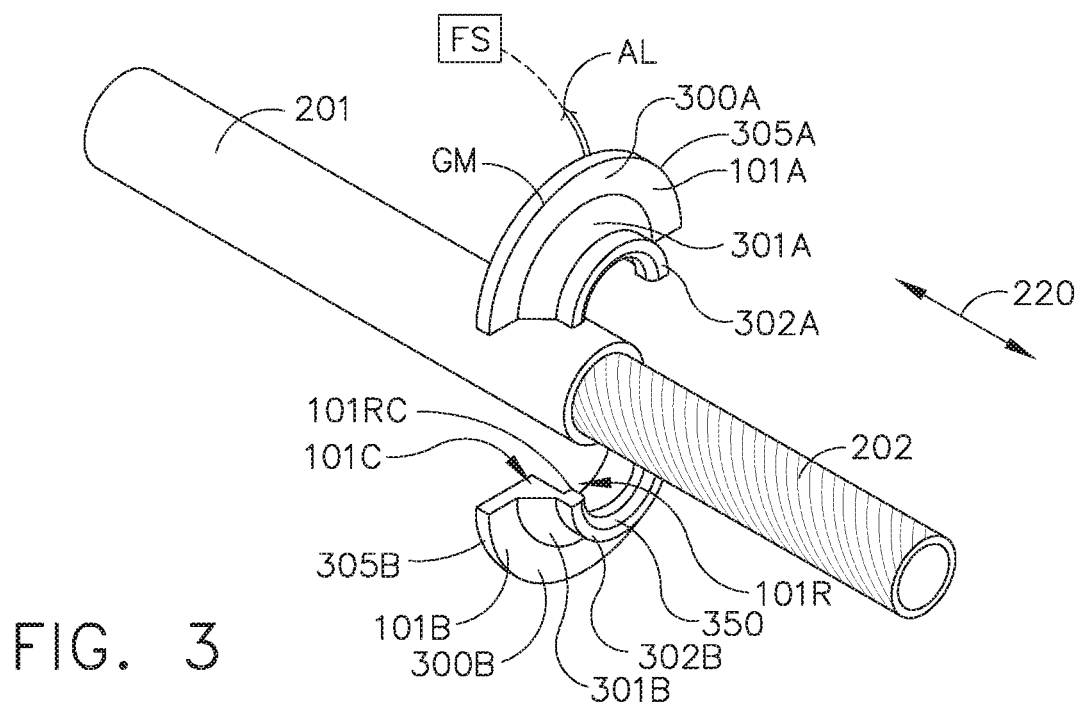
Figure 5:
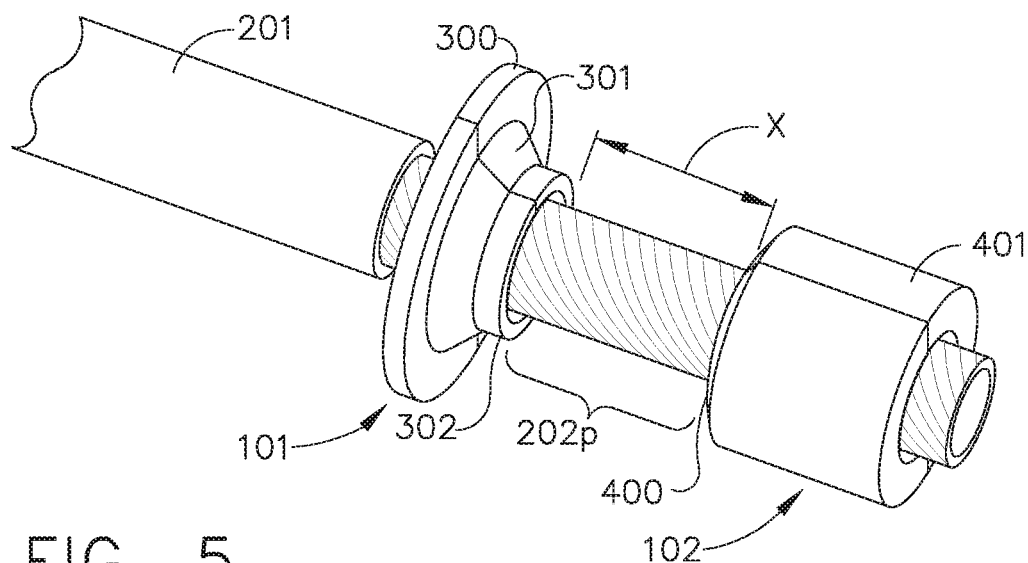

Referring to FIG. 3, the first shielding gripper 101 may include two or more gripper portions 101A, 101B. While two gripper portions 101A, 101B are illustrated in the Figs., it should be understood that the first shielding gripper 101 may include any suitable number of gripper portions that mate with each other to form the first shielding gripper 101 and to, for example, accommodate different diameter cables. In one aspect, each gripper portion 101A, 101B may include locating features 101C that locate the gripper portions 101A, 101B relative to one another as the gripper portions are moved radially in the direction of arrow 221 (FIG. 2) (relative to the cable 200) for engaging the cable 200 as described herein. In other aspects the gripper portions 101A, 101B may be located relative to one another in any suitable manner such as with guide members of the automated machine or hand tool. In another aspect the first shielding gripper 101 may be a unitary one piece member configured to longitudinally slide over the cable 200 in the direction of arrow 220 (FIG. 2). Each of the gripper portions 101A, 101B may include a body 300A, 300B that forms an aperture 101AP when the gripper portions 101A, 101B are mated together. In one aspect the aperture 101AP may include a recess 101R that forms a cable insulating member engagement portion that may locate the first shielding gripper 101 relative to the insulating member 201 such that the shielding 202 is cut a predetermined distance away from an insulating member termination 201T the cut edge of the insulating member as illustrated in FIG. 2). In one aspect the aperture 101AP may include any suitable cable gripping member 350 for gripping at least the shielding 202 of the cable. In one aspect the cable gripping member 350 may be a resilient material or coating that compresses as the gripper portions 101A, 101B are coupled to each other around the cable 200 so as to conform to an irregular shape (i.e., non-circular cross section) of the cable. In other aspects the cable gripping member may conform to a cable having any suitable shape. In other aspects the gripping member 350 may be an inflatable bladder that inflates to grip at least the shielding 202 of the cable 200. Here each gripper portion 101A, 101B may include any suitable fluid passage AL that communicably couples the inflatable gripping member 350 with any suitable fluid source ES for inflating and deflating the gripping member 350. In one aspect the recess 1018 may include a cutting edge 101RC configured to cut the insulating member 201 and grip the cut portion insulating member 201 for removal from the cable 200 as will be described below. The body 300A, 300B of each of the gripping portions 101A, 101B may include a radially extending collar portion 305A, 305B, a stop surface 301A, 301B extending from the collar portion 305A, 305B and a shearing or punch member 302A, 302B extending from the stop surface 301A, 301B. In one aspect the stop surface 301A, 301B may be a conical surface having its base adjacent the collar portion 305A, 305B but in other aspects the stop surface may have any suitable configuration. In other aspects the collar portion 305A, 305B may form the stop surface.

Figure 4:
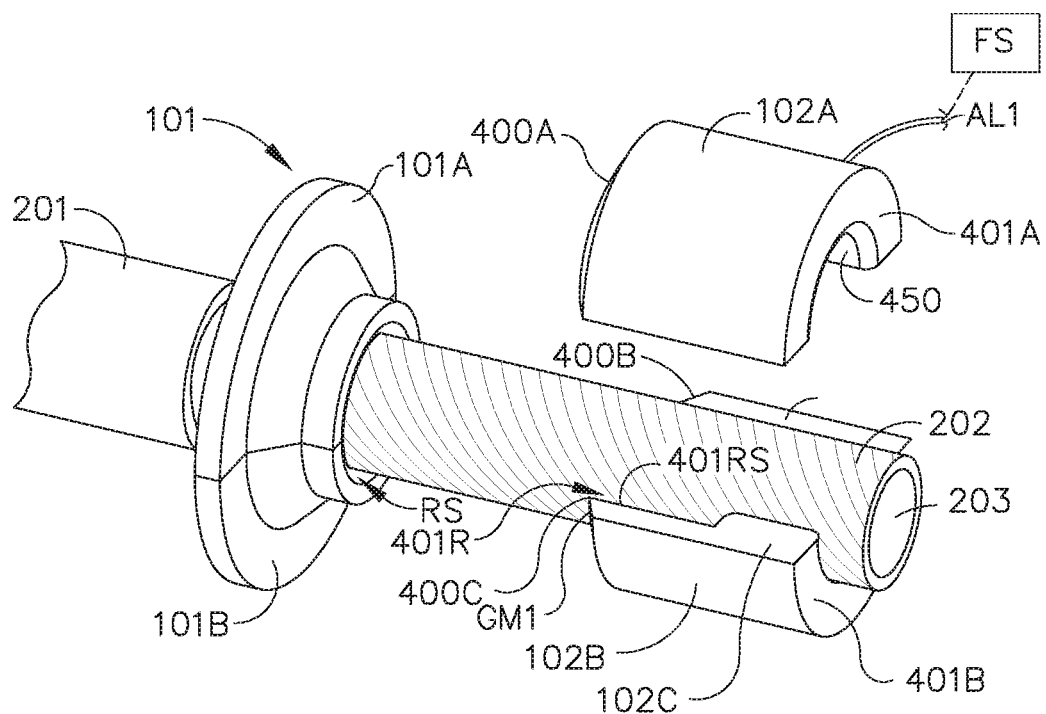

Referring now to FIGS. 1 and 4, the second shielding gripper 102 may include two or more gripper portions 102A, 102B. While two gripper portions 102A, 102B are illustrated in the Figs., it should be understood that the second shielding gripper 102 may include any suitable number of gripper portions that mate with each other to form the second shielding gripper 102 and to, for example, accommodate different diameter cables. In one aspect, each gripper portion 102A, 102B may include locating features 102C that locate the gripper portions 102A, 102B relative to one another as the gripper portions are moved radially in the direction of arrow 221 (FIG. 2) (relative to the cable 200) for engaging the cable 200 as described herein. In other aspects the gripper portions 102A, 102B may be located relative to one another in any suitable manner such as with guide members of the automated machine or hand tool. In another aspect the second shielding gripper 102 may be a unitary one piece member configured to longitudinally slide over the cable 200 in the direction of arrow 220 (FIG. 2). Each of the gripper portions 102A, 102B may include a body 400A, 400B that forms an aperture 102AP when the gripper portions 102A, 102B are mated together. In one aspect the aperture 102AP may include a recess 401R that is shaped and sized to allow insertion of the punch member 302A, 302B of the first shielding gripper 101 into the aperture 102AP, The peripheral edge of the recess 401R may include a shearing or die plate member 400C that interfaces with the punch member 302A, 302B for shearing the shielding 202 in the manner described herein. In one aspect the aperture 101AP may include any suitable cable gripping member 450 for gripping at least the shielding 202 of the cable 200. In one aspect the cable gripping member 450 may be substantially similar to cable gripping member 350 described above. For example, in one aspect, the gripping member 450 may be a resilient material that compresses as the gripper portions 102A, 102B are coupled to each other around the cable 200. In other aspects the gripping member 450 may be an inflatable bladder that inflates to grip at least the shielding 202 of the cable 200. Here each gripper portion 102A, 102B may include any suitable fluid passage AL1 that communicably couples the inflatable gripping member 450 with any suitable fluid source FS for inflating and deflating the gripping member 450.

In one aspect, referring to FIGS. 1, 3 and 4, one or more of the first shielding gripper 101 and the second shielding gripper 102 may include gripping members GM, GM1 configured to grip a cut or scrap portion of the shielding 202 as will be described below so that the cut shielding is held on the second shielding gripper 102 for removal from the cable 200. For example, in one aspect, one or more of the collar portion 305A, 305B, stop surface 301A, 301B and punch member 302A, 302B of the first shielding gripper 101 may include one or more gripping members GM configured to grip a cut or scrap portion of the shielding 202 as will be described below so that the cut shielding is held on the first shielding gripper 101 for removal from the cable 200. In another aspect, the body 400A, 400B of the second shielding gripper 102 may include one or more gripping members GM1 configured to grip a cut or scrap portion of the shielding 202 as will be described below so that the cut shielding is held on the second shielding gripper 102 for removal from the cable 200.

Figure 10:
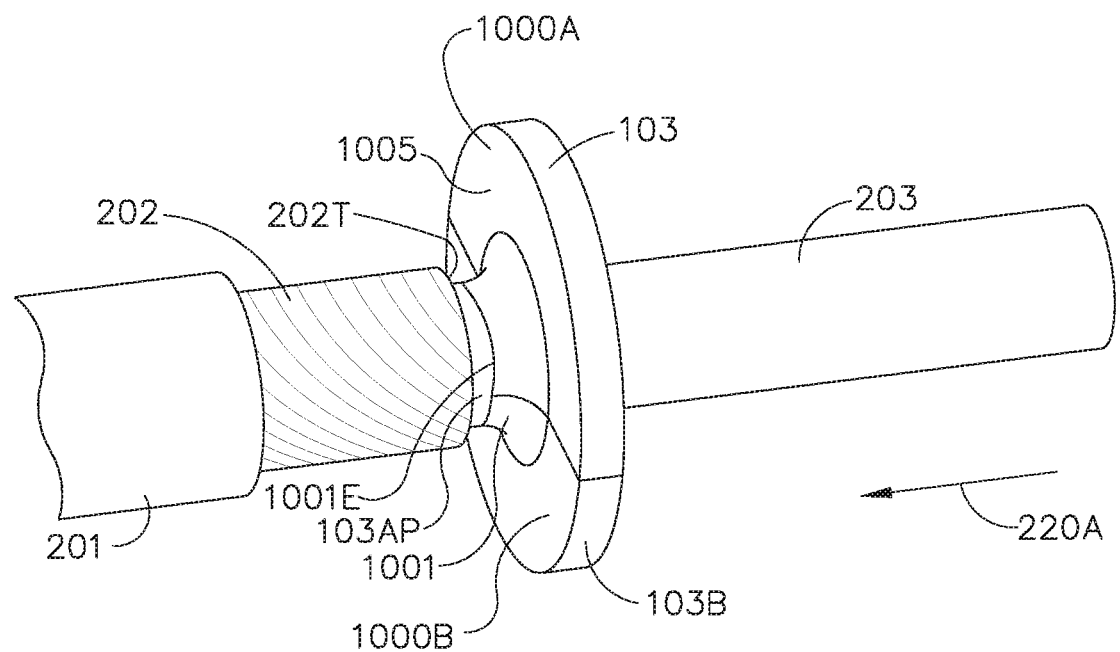

Referring now to FIGS. 1 and 10, an optional shielding fanner 103 may be provided. In one aspect the shielding fanner 103 may be a unitary one piece member that is configured to longitudinally slide over the cable 200 in the direction of arrow 220 (FIG. 2). In other aspects the shielding fanner may include one or more fanning portions 1000A, 1000B that are configured for radially (relative to the cable 200) coupling with each other (in a manner substantially similar to that described herein with respect to the first and second shielding grippers 101, 102). The shielding fanner 103 includes a body 103B (formed, e.g., by the one (in the case of a unitary one piece member) or more fanning portions 1000A, 1000B) having an aperture 103AP shaped and sized to allow the passage of the one or more conductors 203 of the cable. The body 103B also includes a fanning surface 1005 and a plow member 1001 that extends from the folding surface. The plow member 1001 may form at least a portion of the aperture 103AP. The plow member 1001 may be a substantially conical member that includes an edge 1001E configured to pass between the one or more conductors 203 and the shielding 202 such that as the shielding fanner 103 is moved longitudinally, relative to the cable 200, the plow member spreads the shielding layer 202 from the one or more conductors 203 and forces the shielding up against the filming surface 1005 for fanning the shielding as will be described herein.

Figure 12:
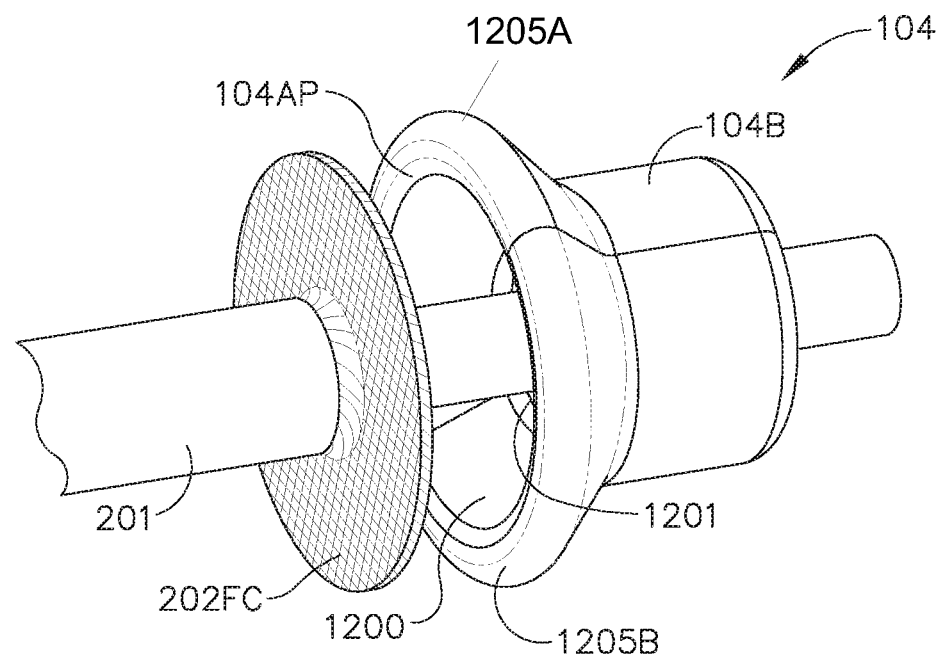
Figure 13:
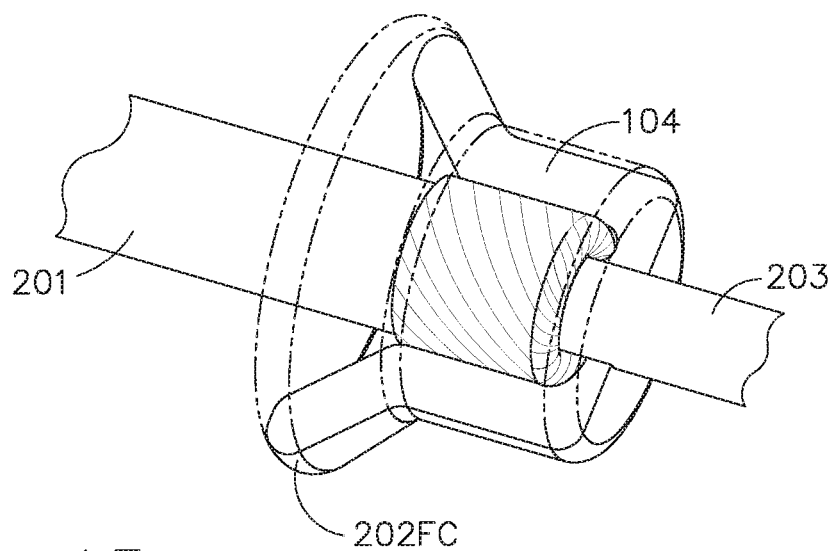

Referring now to FIGS. 1 and 12, an optional shielding folder 104 may be provided. In one aspect the shielding folder 104 may be a unitary one piece member that is configured to longitudinally slide over the cable 200 in the direction of arrow 220 (FIG. 2). In other aspects the shielding folder 104 may include one or more folding portions 1205A, 1205B that are configured for radially (relative to the cable 200) coupling with each other (in a manner substantially similar to that described herein with respect to the first and second shielding grippers 101, 102). The shielding folder 104 includes a body 104B (formed, e.g., by the one (in the case of a unitary one piece member) or more folding portions 1205A, 1205B) having an aperture 104AP. Here the aperture 104AP includes a substantially conical portion 1200 and a substantially cylindrical portion 1201. The substantially conical portion 1200 is configured as a "mouth" or "funnel" leading to the substantially cylindrical portion 1201 so that, as the shielding folder 104 engages the fanned shielding, the substantially conical portion 1200 starts to fold the fanned shielding back over the insulating member 201 and funnels the fanned shielding into the substantially cylindrical portion 1201 to complete the folding of the fanned shielding over the insulating member 201 as will be described below.

Referring now to FIGS. 2-15 an exemplary method for cutting and optionally folding the shielding 202 from a cable 200 will be described in accordance with aspects of the disclosed embodiment. As may be understood, a cable is provided with a portion of the insulating member 201 removed such that the insulating member 201 has a termination 201T and a portion of the shielding 202 and one or more conductors 203 is exposed and extends past the termination 201T. In one aspect the portion of the insulating member may be removed by the first shielding gripper 101 in the manner described above while in other aspects the portion of the insulating member may be cut and removed in any suitable manner.

As can be seen in FIG. 3, the first shielding gripper 101 is positioned to grip at least the shielding 202 of the cable 200 (FIG. 15, Block 1500). For example, the gripper portions 101A, 101B may move laterally or radially (e.g., relative to the cable 200) towards the cable 200 so that the gripper portions 101A, 101B mate with each other (as described above) and substantially surround the cable 200. In other aspects the first shielding gripper 101 may be slid over the wire e.g., the wire is passed through the aperture 101AP) to place the first shielding gripper 101 at a predetermined location of the cable (e.g., such as adjacent the termination 201T). In one aspect where the cable gripping member 350 includes a resilient material the cable gripping member 350 may compress to grip at least the shielding 202 as the gripper portions 101A, 101E are placed around the cable 200. In other aspects, where the cable gripping member 350 includes an inflatable portion, any suitable clearance may be provided between the shielding 202 (and/or the insulating member 201) as the gripper portions 101A, 101B are placed around the cable 200. Here the cable gripping member 350 may be inflated, as described above, to grip at least the shielding 202.

Figure 6:
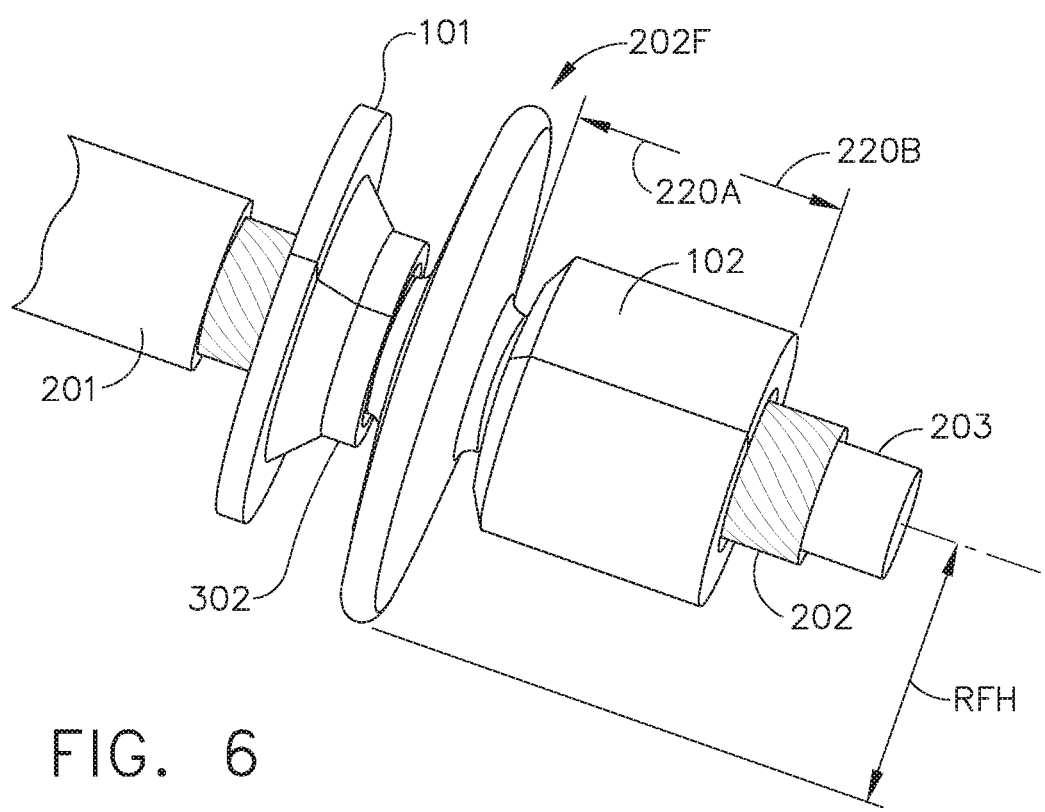
Figure 7:
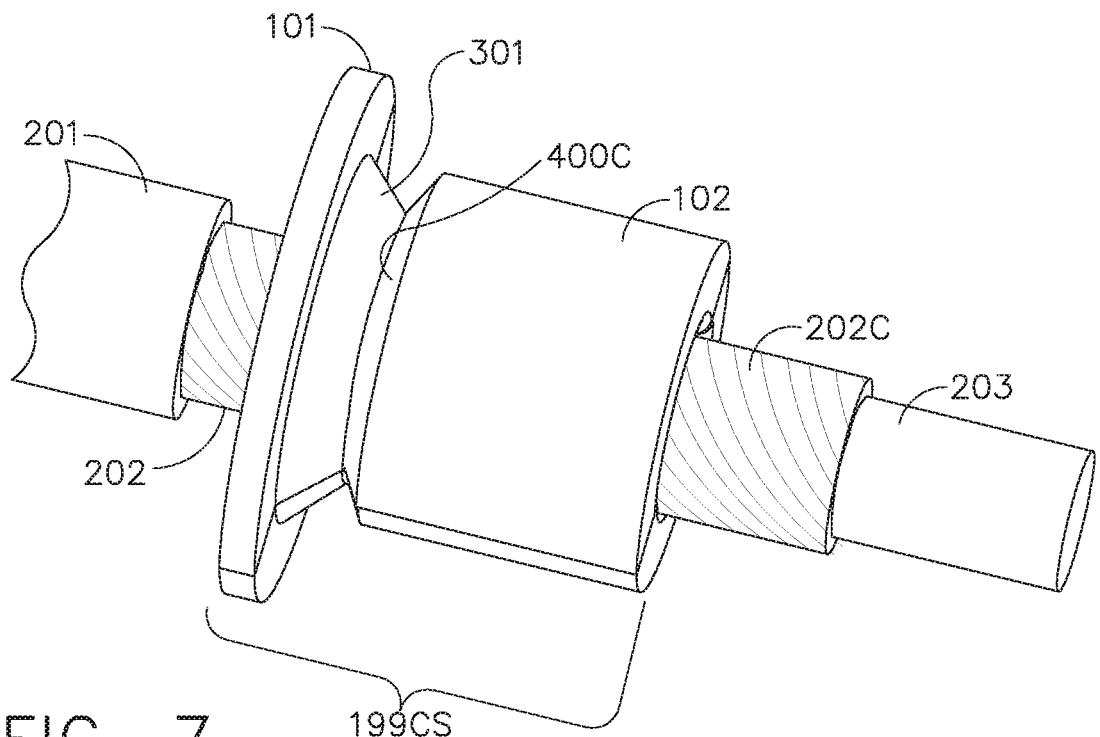

As can be seen in FIG. 4, the second shielding gripper 102 is positioned to grip at least the shielding 202 of the cable 200 (FIG. 15, Block 1501) in a manner substantially similar to that described above with respect to the first shielding gripper 101 so that at least a portion of the first shielding gripper 101 is disposed between the termination 201T and the second shielding gripper 102. As may be realized, the first and second shielding grippers 101, 102 may be longitudinally spaced from each other along the cable 200 by any suitable distance X (FIG. 5) for providing a predetermined radial fan height RFH (FIG. 5) of the shielding. One or more of the first shielding gripper 101 and the second shielding gripper 102 are translated longitudinally (relative to the cable 200) towards the other one of the first shielding gripper 101 and the second shielding gripper 102 (FIG. 15, Block 1502) so that the portion of shielding 202P (FIG. 5) disposed between the first shielding gripper 101 and the second shielding gripper 102 is compressed to effect the fanning of the shielding 202 (FIG. 6).

Figure 8:
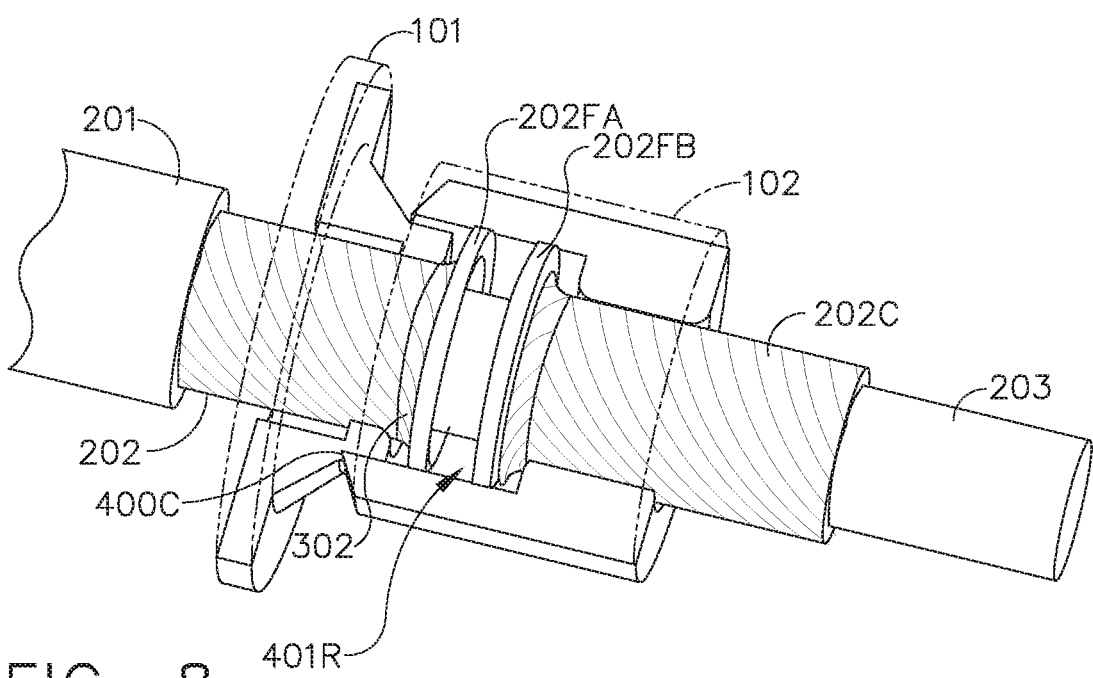

As the first shielding gripper 101 and the second shielding gripper 102 move towards each other, the portion of the shielding 202P is sheared through an interaction of the shearing member 400C and the punch member 302A, 302B. For example, the clearance provided between the outer periphery 302 of the punch member 302A, 302B and the inside surface 401RS of the recess 401R may be such that as the punch member 302A, 302B is inserted into the recess 401R the shearing member 400C shears the shielding 202 (e.g., the fanned shielding) that is pressed up against the punch member 302A, 302B (the sheared shielding is illustrated in FIG. 8). In one aspect the relative movement between the first and second shielding grippers 101, 102 may continue until the shearing member 400C substantially contacts the stop surface 301A, 301B. In other aspects the relative movement between the first and second shielding grippers 101, 102 may stop when the shearing member 400C is a predetermined distance away from the stop surface 301A, 301B.

In another aspect, the position of the first and second shielding grippers 101, 102 may be reversed such that the second shielding gripper 102 is placed adjacent the termination 201T so that at least a portion of the second shielding gripper 102 is disposed between the termination 201T and the first shielding gripper 101.

Once the portion of the shielding 202P is sheared the first and second shielding grippers 101, 102 may be removed from the cable 200 in any suitable manner (FIG. 15, Block 1503). In one aspect the gripper portions 101A, 101B, 102A, 102B of the at least one of the first and second shielding grippers 101, 102 may be decoupled from one another and move away from the cable 200 in the direction of arrow 221 (e.g., radially separate from the cable 200). Here the cut portion of the shielding 202C and the portion of the shielding 202P that was sheared may remain on the cable 200 and be removed from the cable 200 in any suitable manner such as, for exemplary purpose only, with a jet of air or a friction or gripper device that pulls the shielding 202C, 202P off the cable. In other aspects, one or more of the first and second shielding grippers 101, 102 may be moved longitudinally relative to the cable for removing the cut portion of shielding 202C and the portion of shielding 202P that was sheared. For example, the distal most one of the first and second shielding gripper (e.g., relative to the termination 201T) which in the example shown in the drawings is the second shielding gripper 102 may be moved in the direction of arrow 220B (e.g., away from the first shielding gripper 101). The cable gripping member 350 of the second shielding gripper 102 may remain engaged with the cut portion of shielding 202C so that as the second shielding gripper 102 is moved in the direction of arrow 220B, the cut portion of shielding 202C moves with it to remove the cut portion of shielding from the cable 200. As noted above, the second shielding gripper 102 may also include gripping members GM1 configured to grip the portion of the shielding 202P that was sheared such that the portion of the shielding 202P is also carried off of the cable 200 with the second shielding member 102. In other aspects, the proximal most one of the first and second shielding grippers (e.g., relative to the termination 201T), which in the figures is the first shielding gripper 101 may include gripping members GM for gripping the portion of the shielding 202P that was sheared. After the second shielding gripper 102 is removed from the cable, the portion of the shielding 202P retained by the first shielding gripper 101 may be removed from the cable 200 by, for example, an air jet or in any other suitable manner such at by the removal of the first shielding gripper 101 (e.g., moving in the direction of arrow 220B off of the cable).

Figure 9:
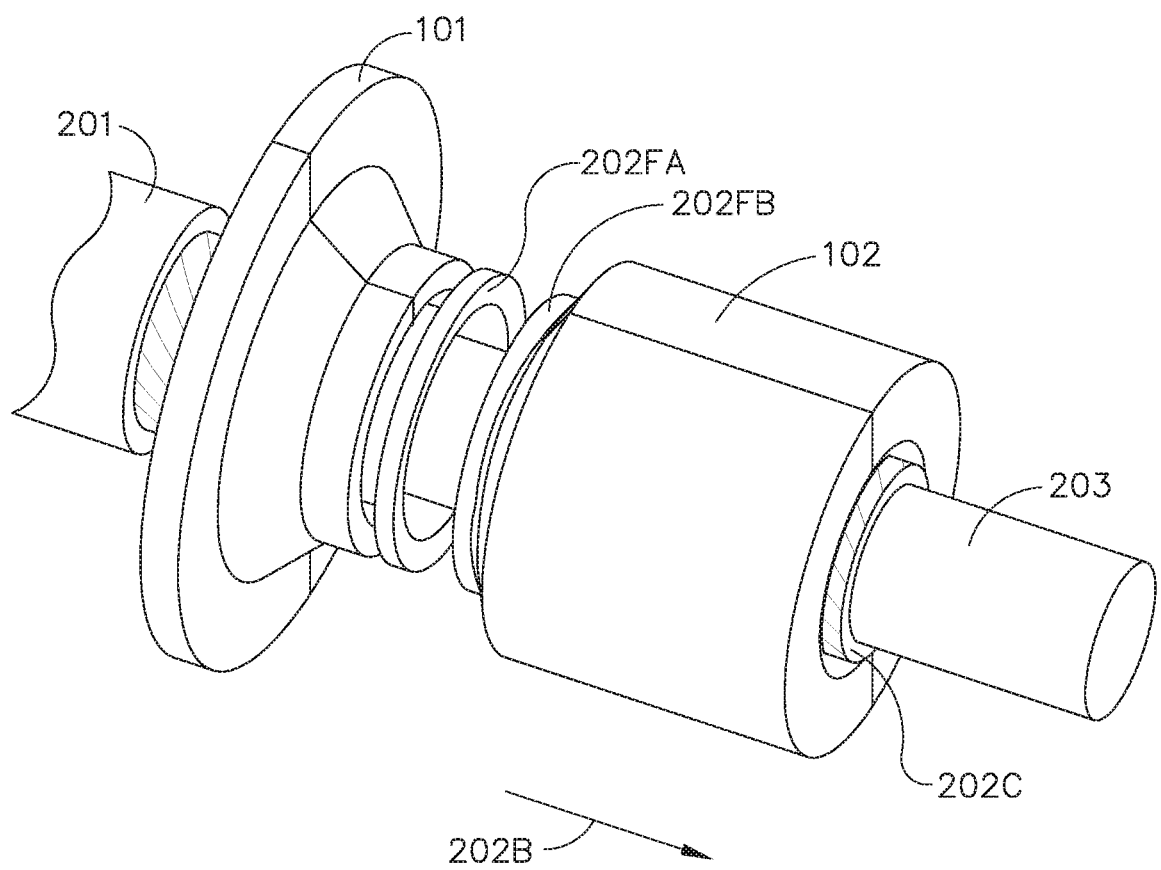
Figure 11:
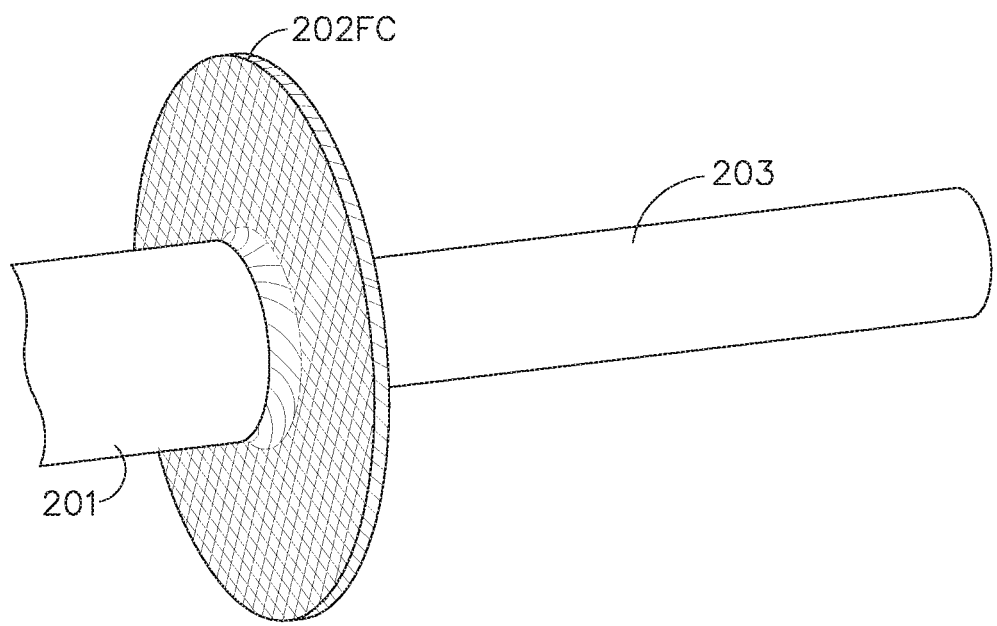

As can be seen in FIG. 9, after the portion of the shielding 202P is sheared the shielding 202 remaining on the cable and the cut portion of the shielding 202C may be fanned in the area the shearing occurred. For example, the cut portion of the shielding 202C may include fanned shielding 202FB, and the shielding 202 remaining on the cable may include fanned shielding 202FA. Removal of, for example, the proximal most one of the first and second shielding gripper 101, 102, which in the example shown in the Figs. is the first shielding gripper, may effect the smoothing of the fanned shielding 202FA as the fanned shielding 202FB is removed from the cable 200 with the cut portion of the shielding 202C. For example, the aperture 101AP of the first shielding gripper 101 (or the second shielding gripper 102 when the second shielding gripper is the proximate most one of the first and second shielding gripper) may include a radiused surface RS and be sized such that as the first shielding gripper 101 is moved in the direction of arrow 220B off of the cable, the fanned shielding 202FA is forced through the aperture 101AP (e.g., guided by the radiused surface RS) and smoothed against the one or more conductors 203 as can be seen in FIG. 10. As noted above, the shielding 202 may be smoothed down against the one or more conductors where the cable is intended for a dead-end application or for any other suitable purpose.

Where the shielding is to be optionally folded back over the insulating member 201, such as for grounded applications (or for any other suitable purpose), in one aspect, the shielding fanner 103 may be placed over the cable 200 in a manner substantially similar to that described above with respect to the first and second shielding grippers 101, 102 so that the shielding fanner 103 is disposed adjacent a termination 202T of the cut and smoothed shielding 202. The shielding fanner 103 may be moved in the direction of arrow 220A towards the smoothed shielding 202 such that the plow member 1001 spreads the shielding 203 from the one or more conductors 203 and forces the shielding up against the fanning surface 1005 for fanning the shielding 202FC as shown in FIG. 11 (FIG. 15, Block 1504). The shielding fanner 103 may be removed from the cable 200 in any suitable manner such as the manner described above with respect to the first and second shielding grippers 101, 102.

In other aspects, the shielding tanner 103 may be omitted where the gripper portions 101A, 101B, 102A, 102B of the proximate most one of first and second shielding gripper 101, 102 are decoupled and radially removed from the cable in the direction of arrow 221 thereby leaving the fanned shielding 202FA on the cable 200.

The shielding folder 104 may be placed over the cable 200 in a manner substantially similar to that described above with respect to the first and second shielding grippers 101, 102. The shielding folder 104 may be moved in the direction of arrow 220A towards the fanned shielding 202FC (or fanned shielding 202FA) so that, as the shielding folder 104 is moved in the direction of arrow 220A, the substantially conical portion 1200 engages the fanned shielding 202FC, 202FA and folds the fanned shielding 202FC, 202FA back over the insulating member 201 until the shielding reaches the termination 201T at which point the folded shielding 202FC, 202FA enters the substantially cylindrical portion 1201 and is pressed or folded against the insulating member 201 of the cable 200. The shielding folder 104 may be removed from the cable 200 in any suitable manner such as the manner described above with respect to the first and second shielding grippers 101, 102.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1600 as shown in FIG. 16 and an aircraft 1702 as shown in FIG. 17. During pre-production, illustrative method 1600 may include specification and design 1604 of the aircraft 1602 and material procurement 1606. During production, component and subassembly manufacturing 1608 and system integration 1610 of the aircraft 1702 take place. Thereafter, the aircraft 1702 may go through certification and delivery 1612 to be placed in service 1614. While in service by a customer, the aircraft 1702 is scheduled for routine maintenance and service 1616 (which may also include modification, reconfiguration, refurbishment, and so on).

Each of the processes of the illustrative method 1600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, the aircraft 1702 produced by the illustrative method 1600 may include an airframe 1718 with a plurality of high-level systems and an interior 1722. Examples of high-level systems include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

Apparatus and methods shown or described herein may be employed during any one or more of the stages of the manufacturing and service method 1600. For example, components or subassemblies corresponding to component and subassembly manufacturing 1608 may be fabricated or manufactured in a manner similar to components or subassemblies produced while the aircraft 1702 is in service. Also, one or more aspects of the apparatus, method, or combination thereof may be utilized during the production states 1608 and 1610, for example, by substantially expediting assembly of or reducing the cost of an aircraft 1702. Similarly, one or more aspects of the apparatus or method realizations, or a combination thereof, may be utilized, for example and without limitation, while the aircraft 1702 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

The aspects of the disclosed embodiment provide for an automated and/or hand operated removal and finishing of the shielding layer of a cable without damage to the one or more conductors therein.

In accordance with one or more aspects of the disclosed embodiment an apparatus for processing a cable including an insulating member, a shielding layer, and a conductor, the apparatus includes a frame forming a housing having an aperture configured to receive an end portion of the cable; a first gripping member disposed within the housing and being configured to grip the cable; and a second gripping member disposed within the housing and being configured to grip the cable; wherein the second gripping member is mounted within the housing so as to be movable relative to the first gripping member to effect fanning and cutting of a portion of the shielding layer.

In accordance with one or more aspects of the disclosed embodiment the apparatus further includes a controller configured to: couple the first gripping member to the insulating member; couple the second gripping member to the shielding layer; and effect relative movement between the first gripping member and the second gripping member towards each other to fan and cut the shielding layer.

In accordance with one or more aspects of the disclosed embodiment, the controller is further configured to effect relative movement between the first gripping member and the second gripping member away from each other to remove the shielding layer.

In accordance with one or more aspects of the disclosed embodiment the first gripping member includes a shearing portion and the second gripping member includes a mating shearing portion configured to cut the shielding layer when the shearing portion is mated with the mating shearing portion.

In accordance with one or more aspects of the disclosed embodiment the first gripping member and the second gripping member are each formed in two or more portions such that when the portions are mated an aperture, configured to grip the cable, is formed where a cable interface surface of the aperture includes a cable gripping member.

In accordance with one or more aspects of the disclosed embodiment the cable gripping member includes one or more of a resilient coating and an inflatable bladder configured to conform to a cross-sectional shape of the cable.

In accordance with one or more aspects of the disclosed embodiment the apparatus further includes a shielding fanner that is configured for relative movement with the cable, the shielding fanner including a fanning surface configured for insertion between the conductor and the shielding layer for effecting fanning of the shielding layer.

In accordance with one or more aspects of the disclosed embodiment the apparatus further includes a shielding folder that is configured for relative movement with the cable, the shielding folder including an aperture having a folding surface, the aperture being configured for insertion of the fanned shielding into the aperture such that the folding surface folds the fanned shielding over the insulating member.

In accordance with one or more aspects of the disclosed embodiment an apparatus for cable processing includes a frame forming a housing; and a clamping system configured to automatically fan and cut a shielding layer of a cable inserted into the apparatus, and remove a cut portion of the shielding layer from the cable.

In accordance with one or more aspects of the disclosed embodiment the clamping system includes a first gripping member disposed within the housing and being configured to grip the cable; and a second gripping member disposed within the housing and being configured to grip the cable; wherein the second gripping member is mounted within the housing so as to be movable relative to the first gripping member to effect fanning and cutting of a portion of the shielding layer.

In accordance with one or more aspects of the disclosed embodiment the second gripping member is configured to remove the cut portion of the shielding layer from the cable.

In accordance with one or more aspects of the disclosed embodiment the apparatus further includes a controller configured to: couple the first gripping member to an insulating member or the shielding layer; coupling the second gripping member to the shielding layer; and effect relative movement between the first gripping member and the second gripping member towards each other to fan and cut the shielding layer.

In accordance with one or more aspects of the disclosed embodiment the first gripping member includes a shearing portion and the second gripping member includes a mating shearing portion configured to cut the shielding layer when the shearing portion is mated with the mating shearing portion.

In accordance with one or more aspects of the disclosed embodiment the first gripping member and the second gripping member are each formed in at least two portions such that when the portions are mated an aperture, configured to grip the cable, is formed where a cable interface surface of the aperture includes a cable gripping member.

In accordance with one or more aspects of the disclosed embodiment the cable gripping member includes one or more of a resilient coating and an inflatable bladder configured to conform to a cross-sectional shape of the cable.

In accordance with one or more aspects of the disclosed embodiment the apparatus further includes a shielding fanner that is configured for relative movement with the cable, the shielding fanner including a fanning surface configured for insertion between the conductor and the shielding layer for effecting fanning of the shielding layer.

In accordance with one or more aspects of the disclosed embodiment the apparatus further includes a shielding folder that is configured for relative movement with the cable, the shielding folder including an aperture having a folding surface, the aperture being configured for insertion of the fanned shielding into the aperture such that the folding surface folds the fanned shielding over an insulating member.

In accordance with one or more aspects of the disclosed embodiment a method for processing a cable having an insulating member, a shielding layer and one or more conductors, includes positioning a first shielding gripper and a second shielding gripper relative to the cable so that each of the first and second shielding gripper grip at least the shielding layer; moving the first and second shielding grippers relative to each other so that one or more of the first and second shielding gripper moves along a longitudinal axis of the cable towards the other one of the first and second shielding gripper to fan of a portion of the shielding layer gripped by the first and second shielding grippers; and shearing the portion of the shielding layer from the cable with the first and second shielding grippers through the relative movement of the first and second shielding grippers.

In accordance with one or more aspects of the disclosed embodiment the method further includes smoothing a sheared portion of the shielding layer attached to the cable with a movement of one or more of the first and second shielding gripper along the longitudinal axis of the cable.

In accordance with one or more aspects of the disclosed embodiment the method further includes positioning a shielding fanner relative to the cable so that the shielding fanner is adjacent to a sheared portion of the shielding layer; and moving the shielding fanner and the cable relative to each other so that the shielding fanner moves along the longitudinal axis of the cable towards a cut portion of the shielding layer to fan the shielding layer.

In accordance with one or more aspects of the disclosed embodiment the method further includes positioning a shielding folder relative to the cable so that the shielding folder is adjacent a fanned portion of the shielding layer; and moving the shielding folder and the cable relative to each other so that the shielding folder moves along the longitudinal axis of the cable towards a fanned portion of the shielding layer to fold the shielding layer over the insulating member.

In accordance with one or more aspects of the disclosed embodiment a cable processing system includes a frame having at least a first movable member and a second movable member; a first shielding gripper disposed on the first movable member, the first shielding gripper being configured for placement around and gripping of at least a shielding layer of a cable; and a second shielding gripper disposed on the second movable member, the second shielding gripper being configured for placement around and gripping of at least the shielding layer of the cable, the first and second shielding gripper are arranged on the frame so that the cable passes simultaneously through both the first and second shielding grippers; wherein the frame is arranged so that relative movement of the first and second movable members causes relative movement between the first and second shielding grippers to fan and circumferentially shear the shielding layer with the first and second shielding grippers.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A cable processing system comprising:
a frame having at least a first movable member and a second movable member;
a first shielding gripper disposed on the first movable member, the first shielding gripper being configured for placement around and gripping of at least a shielding layer of a cable; and
a second shielding gripper disposed on the second movable member, the second shielding gripper being configured for placement around and gripping of at least the shielding layer of the cable, the first and second shielding grippers are arranged on the frame so that the cable passes simultaneously through both the first and second shielding grippers;
wherein the frame is arranged so that
relative movement of the first and second movable members causes relative movement between the first and second shielding grippers to fan and circumferentially shear the shielding layer with the first and second shielding grippers, and
both the first shielding gripper and the second shielding gripper are moved along a longitudinal axis of the cable so that the cable is removed from the first shielding gripper and the second shielding gripper, and the sheared portion of the shielding layer, gripped by at least one of the first shielding gripper and the second shielding gripper, is removed from the cable.

2. The system of claim 1, wherein the frame is further arranged so that one of the first shielding gripper and the second shielding gripper is moved along the longitudinal axis of the cable so that another sheared portion of the shielding layer attached to the cable is smoothed by the one of the first shielding gripper and the second shielding gripper.

3. The system of claim 1, further comprising:
a shielding fanner disposed relative to the cable, the shielding fanner is coupled to the frame so that the shielding fanner and the cable move relative to each other, where the shielding fanner is configured to fan the shielding layer.

4. The system of claim 1, further comprising:
a shielding folder disposed relative to the cable, the shielding folder is coupled to the frame so that the shielding folder and the cable move relative to each other, where the shielding folder is configured to fold the shielding layer over an insulating member of the cable.

5. A method for processing a cable having an insulating member, a shielding layer and one or more conductors, the method comprising:
receiving a portion of the cable within a housing;
gripping the cable with a first gripping member and a second gripping member disposed within the housing;
moving the second gripping member toward the first gripping member to fan and cut a portion of the shielding layer, and
moving both the first gripping member and the second gripping member along a longitudinal axis of the cable so that the cable is removed from the first gripping member and the second gripping member, and the cut portion of the shielding layer, gripped by at least one of the first gripping member and the second gripping member, is removed from the cable.

6. The method of claim 5, further comprising coupling the first gripping member to the insulating member and coupling the second gripping member to the shielding layer for fanning and cutting the shielding layer.

7. The method of claim 5, further comprising moving the first gripping member and the second gripping member away from each other to remove the cut portion of the shielding layer.

8. The method of claim 5, further comprising cutting the shielding layer with a shearing portion of the first gripping member and a mating shearing portion of the second gripping member, where the shearing portion is mated with the mating shearing portion.

9. The method of claim 5, further comprising mating two or more respective portions of the first gripping member and the second gripping member so as to form a respective aperture that grips the cable, where a cable interface surface of the respective aperture of each of the first gripping member and the second gripping member includes a cable gripping member.

10. The method of claim 5, further comprising inserting a fanning surface of a shielding fanner between the one or more conductors and the shielding layer to effect fanning of the shielding layer.

11. The method of claim 10, further comprising inserting the fanned portion of the shielding layer into an aperture of a shielding folder and moving the shielding folder relative to the cable so that a folding surface of the aperture folds the fanned portion of the shielding layer over the insulating member.

12. A method for processing a cable having an insulating member, a shielding layer and one or more conductors, the method comprising:
gripping the cable at two distinct locations along a longitudinal axis of the cable with a first gripping member and a second gripping member of a cable clamping system;
moving the second gripping member relative to the first gripping member to automatically fan and cut the shielding layer of the cable inserted through the first gripping member and the second gripping member, and removing a cut portion of the shielding layer from the cable by moving both the first gripping member and the second gripping member along the longitudinal axis of the cable so that the cable is removed from the first gripping member and the second gripping member where the cut portion of the shielding layer, gripped by at least one of the first gripping member and the second gripping member, is removed from the cable.

13. The method of claim 12, wherein the first gripping member and the second gripping member are relatively moved towards each other for fanning and cutting the shielding layer.

14. The method of claim 12, wherein the cut portion of the shielding layer is removed from the cable by the second gripping member.

15. The method of claim 12, further comprising coupling the first gripping member to the insulating member of the cable or the shielding layer, and coupling the second gripping member to the shielding layer so that relative movement between the second gripping member and the first gripping member automatically fans and cuts the shielding layer of the cable.

16. The method of claim 12, further comprising cutting the shielding layer by mating a shearing portion of the first gripping member with a mating shearing portion of the second gripping member.

17. The method of claim 12, further comprising:
forming an aperture of a respective one of the first gripping member and the second gripping member by mating at least two portions of the respective one of the first gripping member and the second gripping member; and
gripping the cable with a cable gripping member of a cable interface surface of the aperture.

18. The method of claim 17, wherein the cable gripping member grips the cable by conforming to a cross-sectional shape of the cable.

19. The method of claim 12, further comprising inserting a fanning surface of a shielding fanner between the one or more conductors and the shielding layer to effect fanning of the shielding layer.

20. The method of claim 19, further comprising inserting the fanned shielding into an aperture of a shielding folder so that a folding surface of the shielding folder folds the fanned shielding over the insulating member of the cable.

* * * * *